A. HERZKA.
PHOTOGRAPHIC PLATE.
APPLICATION FILED NOV. 1, 1909.
1,010,141.
Patented Nov. 28, 1911.
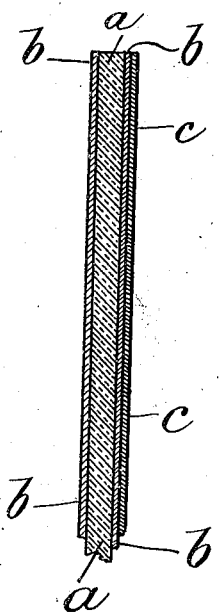
Witnesses:
Kenneth Romanes
E. Beckers-Scheins
Inventor:
Adolf Herzka
by Paul P. Schilling
Attorney.

UNITED STATES PATENT OFFICE.

ADOLF HERZKA, OF DRESDEN, GERMANY.

PHOTOGRAPHIC PLATE.

1,010,141.  Specification of Letters Patent.  Patented Nov. 28, 1911.

Application filed November 1, 1909.  Serial No. 525,740.

*To all whom it may concern:*

Be it known that I, ADOLF HERZKA, a subject of the German Emperor, and residing at Dresden, German Empire, have invented certain new and useful Improvements in Photographic Plates, of which the following is a specification.

For the purpose of preventing halation various methods have been tried, including that of coating the emulsion support, whether a rigid plate (glass) or a flexible plate (film), with a colored layer of gelatin, whose pigment is soluble in water. It has been found in practice, however, that when the emulsion is applied, the pigment of the gelatin layer, despite previous drying, is apt to dissolve again and enter the emulsion, whereby the degree of sensitiveness of the latter is detrimentally affected. Attempts have been made to overcome this difficulty by hardening the gelatin, with a view to reducing the solubility of the pigment. This has not, however, proved satisfactory, for the gelatin layer, owing to its relatively considerable thickness, when hard is liable to bind the color in such manner that the latter is not properly dissolved out again on developing. The reduction of the sensitiveness to light caused by the color penetrating the emulsion layer renders exposure of the plate for a considerable time necessary, and the colored layer cannot sufficiently stop the light during so long an interval. Thus rays pass through and halation to a greater or less extent is the result.

According to my invention I overcome the drawbacks in question by distributing the colored gelatin over both sides of the emulsion support, instead of applying it only to the one side thereof, as has hitherto been the practice.

In order to make my invention more readily understood, I have illustrated it on the accompanying drawing, which shows a cross-section through my new antihalation plate, and in which the reference character *a* denotes the transparent support, of glass, celluloid, or the like, *b* the light-absorbing material, and *c* the sensitized emulsion.

The advantage of my new method is that the layer can be hardened by any suitable gelatin hardening agent without ensuing inconvenience. For by distributing the gelatin over both sides of the support the thickness of the layer has been reduced by one half; and after the hardening, which imparts compactness to the material, the thickness is reduced, it may be, even below one half. The layer is now sufficiently thin to admit of the color being properly dissolved out in spite of the hardened condition. Despite the thinness of the layer the hardness bestows such strength that the layer remains quite neutral with respect to the emulsion, so that none of the color enters the latter. In this manner the full sensibility to light of the emulsion is maintained and an extremely short exposure will be found adequate.

In carrying out the new method in practice, the emulsion support (glass plate or film) may be immersed in a vessel containing the previously colored gelatin in liquid state. The support is then withdrawn and the gelatin, which will now be distributed over both sides, is hardened by any approved means. The support so prepared is now allowed to dry thoroughly, whereupon the emulsion is applied in any well-known manner.

By employing gelatin of corresponding consistency a coating of any desired thickness can be attained.

Having thus described my invention, I declare that what I claim as new and desire to secure by Letters Patent is:—

A photographic plate, comprising a transparent support, a relatively thin light-absorbing layer on each face thereof, and a coating of sensitized emulsion on one of said light-absorbing layers, substantially as set forth.

In testimony whereof I affix my signature in presence of two witnesses.

ADOLF HERZKA.

Witnesses:
PAUL ARRAS,
CLÄRE SIMON.